United States Patent [19]
Hufnagle et al.

[11] Patent Number: 5,109,722
[45] Date of Patent: May 5, 1992

[54] SELF-DETENTING TRANSMISSION SHIFT KEY

[75] Inventors: Donald L. Hufnagle, Apple Valley; Steven J. Svoboda, Bloomington, both of Minn.

[73] Assignee: The Toro Company, Minneapolis, Minn.

[21] Appl. No.: 465,308

[22] Filed: Jan. 12, 1990

[51] Int. Cl.$^5$ .............................................. F16H 3/08
[52] U.S. Cl. ................................. 74/371; 74/372; 74/366; 74/475
[58] Field of Search .............. 74/369, 366, 333, 335, 74/527, 372, 371, 475

[56] References Cited

U.S. PATENT DOCUMENTS

| | | | |
|---|---|---|---|
| 501,381 | 7/1893 | Taylor | 74/371 |
| 1,278,975 | 9/1918 | Miller | 74/371 |
| 2,763,350 | 9/1956 | Klaue | 74/369 X |
| 3,346,087 | 10/1967 | Colombo et al. | 74/371 X |
| 3,491,663 | 1/1970 | Morgan | 74/527 X |
| 3,502,184 | 3/1970 | Pawlina et al. | 74/527 X |
| 3,602,245 | 8/1971 | Meisel | 74/527 X |
| 3,812,735 | 5/1974 | Von Kaler | 74/371 |
| 4,656,886 | 4/1987 | Edwards | 74/475 |
| 4,702,119 | 10/1987 | Edwards | 74/372 X |
| 4,702,120 | 10/1987 | Okada et al. | 74/371 |
| 4,779,475 | 10/1988 | Irikura et al. | 74/371 |
| 4,841,794 | 6/1989 | Hikishima | 74/371 |

FOREIGN PATENT DOCUMENTS

| | | | |
|---|---|---|---|
| 2658695 | 6/1978 | Fed. Rep. of Germany | 74/527 |
| 21138 | 5/1946 | Finland | 74/369 |
| 475179 | 4/1951 | Italy | 74/369 |
| 0288750 | 12/1987 | Japan | 74/371 |
| 005832 | of 1904 | United Kingdom | 74/371 |

OTHER PUBLICATIONS

Toro Drawing No. 62-6670, Oct. 29, 1986.
IBM Technical Disclosure Bulletin, vol. 22, No. 6, Nov. 1979, Sliding Selector Switch, J. W. Rudolph.

Primary Examiner—Leslie A. Braun
Assistant Examiner—Daniel Wittels
Attorney, Agent, or Firm—James W. Miller

[57] ABSTRACT

A variable speed, draw key transmission having a number of gears of different gear ratios rotatably journalled on a shaft. The shaft includes a keyway containing a slidable key that may be selectively moved between the gears to change the output speed of the transmission. The key includes a bump and the keyway a series of notches forming a detent for indicating to the operator the gear engaging positions of the key.

9 Claims, 1 Drawing Sheet

SELF-DETENTING TRANSMISSION SHIFT KEY

TECHNICAL FIELD

This invention relates to a draw key transmission in which a slidable shift key carried on a shaft moves between various gears having different gear ratios to change the transmission output speed. More particularly, this invention relates to an improved detent means for providing detent indications at each position of the key in which the key is coupled to one of the gears.

BACKGROUND OF THE INVENTION

Various pieces of outdoor power equipment, such as lawn mowers, snowblowers and the like, are self-propelled by small mechanical transmissions. These transmissions usually have different speeds which the operator can select using a control lever. The transmission is usually contained inside the housing of the device while the control lever is easily accessible to the operator. For example, in a lawn mower, the transmission is mounted beneath the mower deck while the control lever is up on the control panel of the lawn mower handle assembly.

U.S. Pat. No. 3,812,735 to Von Kaler discloses a typical transmission of this type known as a draw key transmission. Such a transmission includes a shaft having a plurality of gears of different gear ratios rotatably journalled thereon. A slidable key contained in a keyway in the shaft is used to couple one of the gears to the shaft to provide a first output speed for the transmission. The key can be selectively moved in the keyway to be coupled to any of the other gears to change the transmission output speed in accordance with the gear ratio of the selected gear.

Transmissions of this type desirably have a detent means for indicating to the operator when the key is coupled to each of the gears. The detent means lets the operator feel when the key "clicks into place" in each gear. This has sometimes been done using a detent structure remotely located from the transmission. For example, in certain prior art lawn mowers manufactured by The Toro Company, the assignee of this invention, the detent structure is located within the control lever assembly mounted on the control panel. Movement of the control lever is transmitted to the shift key through an elongated cable.

The length and the adjustment of the control lever cable is difficult to control precisely. Thus, it often happens that the detent positions provided by such a "remotely located" detent structure become misaligned with the actual positions of the key in the keyway. In other words, the operator moves the control lever until reaching a detent position, but the key is not yet engaged in any gear, i.e. it is between gears. Thus, the operator has to keep moving the control lever forwardly from the detent position "hunting for" the spot at which the gear will become engaged. This is most often done by moving the control lever and simultaneously engaging the transmission until the key pops into place in the gear allowing the mower to begin moving. However, such a procedure is annoying and confusing to the operator and is obviously undesirable.

In some cases, the detent structure is provided as part of the transmission itself, rather than being remotely located from the transmission as described above. For example, in the Von Kaler patent referred to previously, a rotary shift shaft is connected to the shift key through a fork and collar arrangement for sliding the key in the keyway by rotating the shift shaft. In addition, a detent plate having a plurality of spaced detents in an arcuate edge thereof is carried on the shift shaft. A spring biased ball located on a wall of the transmission housing engages the detents to define the different detent positions corresponding to engagement of the respective change speed gears.

While the detent positions provided by the ball/plate structure of Von Kaler theoretically are more aligned with the gear engaging positions of the key, it is still not a direct measurement of key location. It depends on the accurate location of the detent plate on the shift shaft during manufacture of the transmission. It also depends on the detent plate maintaining the same relative location on the shift shaft during operation of the transmission over extended periods of time. Any relative rotation of the shift plate on the shift shaft, or improper placement of the shift plate in the first place, will cause the same kind of problem referred to above, namely the detent positions will not precisely correspond to gear engagement positions of the key.

In addition, many of the detent structures of the prior art include numerous parts added to the transmission or the device in which the transmission is used. Referring again to the Von Kaler structure, the detent means includes the detent plate, the ball, the biasing spring for the ball, and the structure for housing the ball and spring. These additional parts add additional expense to the transmission, which is also undesirable.

SUMMARY OF THE INVENTION

One aspect of this invention is to provide a draw key transmission having simpler and less expensive detent means than those of the prior art.

Another aspect of this invention is to provide a draw key transmission having detent means which will not become misaligned with the gear engaging positions of the key.

Accordingly, an improved variable speed, draw key transmission according to the present invention includes a slidable key carried on a shaft for rotation therewith. The key moves between various gears having different gear ratios journalled on the shaft to change the output speed of the transmission. The gears and the key have means for coupling the key to the gears for rotating only one gear at a time with the shaft. The improvement comprises detent means located between the key and the shaft for providing detent indications at each location of the key in which the key is coupled to one of the gears.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
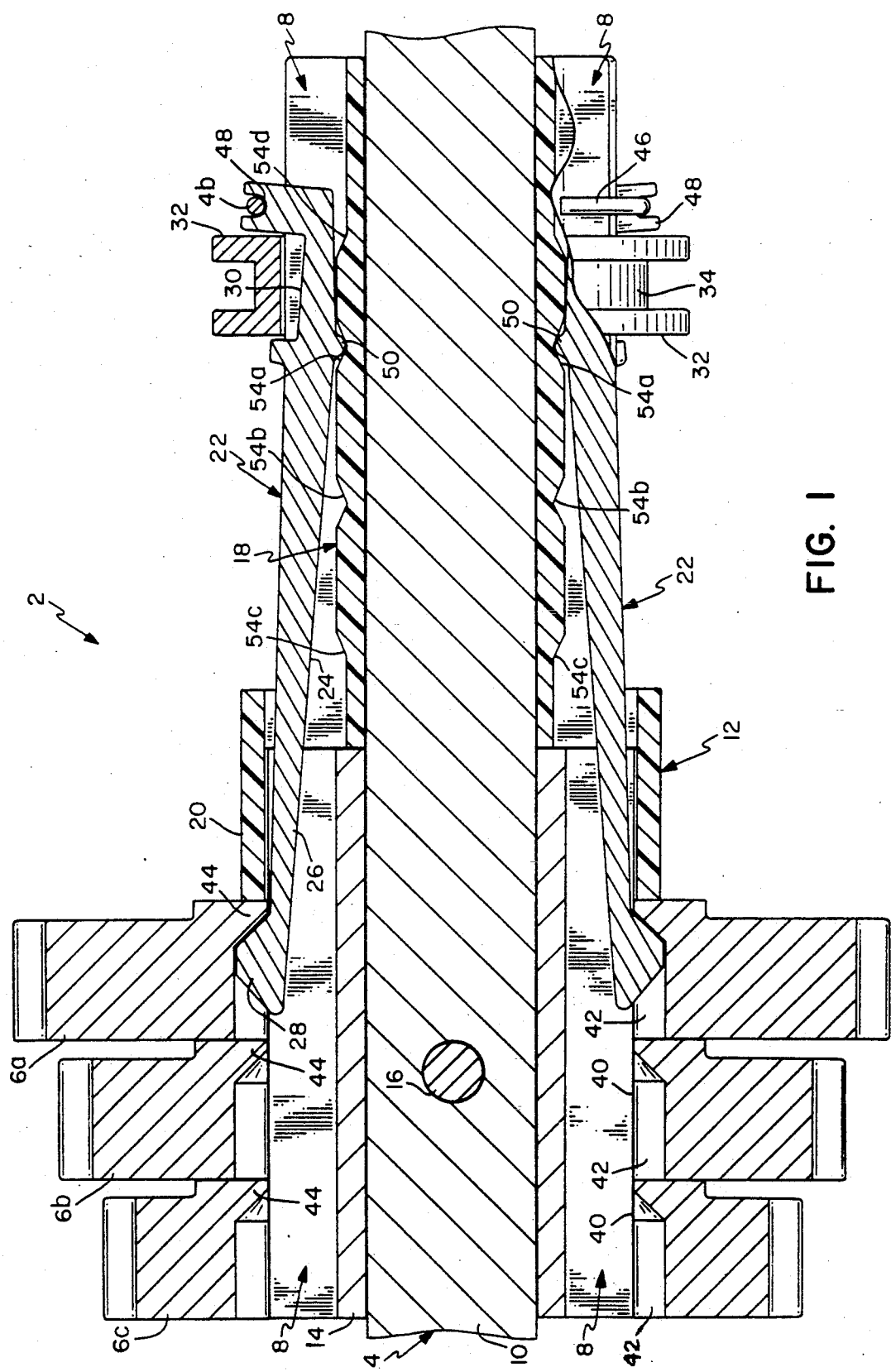
FIG. 1 is a partial cross-sectional view of a portion of a draw key transmission according to the present invention, particularly illustrating the improved detent means of this invention cooperating between the key and the shaft.

The present invention relates to a draw key transmission 2 of the general type illustrated in U.S. Pat. No. 3,812,735 to Von Kaler, which patent is incorporated herein by reference. Only those portions of transmission 2 germane to an understanding of the present invention will be described herein. The Von Kaler patent may be referred to for a more complete description of the structure and operation of this type of transmission.

Transmission 2 includes a rotatable shaft 4 on which a plurality of gears 6a, 6b and 6c are rotatably journalled. Gears 6 have different gear ratios and are referred to as "change speed" gears depending on which gear is coupled to shaft 4 for rotation therewith, as described later. Other than for a difference in size, each gear 6 is generally identical.

Shaft 4 has at least one longitudinal keyway 8 extending over at least a portion of its length. As shown in FIG. 1, two such keyways 8 are actually provided in shaft 4. However, a greater or lesser number of keyways 8 could be used if desired.

As shown in FIG. 1, shaft 4 comprises an inner cylindrical shaft member 10 having an outer sleeve assembly 12 secured to inner shaft member 10 for rotation therewith. Outer sleeve assembly 12 includes a metallic cylindrical sleeve 14 secured to inner shaft member 10 by a pin 16 and a plastic shift sleeve 18. Shift sleeve 18 has an enlarged collar 20 on one end which fits over one end of metallic sleeve 14 and abuts against one of gears 6. A thrust bearing (not shown) or some other suitable member on inner shaft member 10 keeps shift sleeve 18 in place with collar 20 abutting gear 6a.

Keyway 8 is formed in outer sleeve assembly 12 rather than inner shaft member 10. A first portion of keyway 8 is provided in plastic shift sleeve 18 and a second portion of keyway 8 is provided in metallic sleeve 14. When these parts are assembled on inner shaft member 10, the first and second keyway portions are aligned with one another to form, in effect, a single continuous keyway 8 on shaft 4. Shift sleeve 18 is not directly fixed to shaft 4 for rotation therewith, but rotates with metallic sleeve 14 by virtue of the keys 22 which are long enough to span both the first and second keyway portions comprising keyway 8. In addition, shift sleeve 18 can have recesses on one end for engagement with drive lugs on the abutting end of metallic sleeve 14.

Alternatively, shaft 4 could be as shown in the Von Kaler patent, i.e. a one-piece solid shaft 4 in which keyway 8 is machined or otherwise formed directly in shaft 4. Thus, the word shaft as used herein is intended to cover both a solid shaft 4 as in Von Kaler or a shaft 4 made of multiple components assembled together for rotation as a unit as disclosed in FIG. 1.

A generally identical shift key 22 is slidably carried in each keyway 8. Shift key 22 is an integral one-piece key made of powdered metal hardened through heat treating. Key 22 has a non-planar bottom surface 24 shaped as a fulcrum such that key 22 pivots about the fulcrum point. Key 22 includes a relatively long arm 26 extending forwardly of the fulcrum point and terminating in an upwardly extending gear engaging lug 28. Key 22 also has a short rear portion to the rear of the fulcrum point having an upwardly extending U-shaped channel 30.

Transmission 2 includes suitable means for shifting keys 22 as a unit in keyways 8. The shifting means comprises a shift ring 32 received around shift sleeve 18 and resting in channel 30 of keys 22. Ring 32 includes an annular groove 34 which receives the opposed prongs of a rotatable shift fork (not shown). As the operator rotates the shift fork, e.g. through a control lever/cable structure on the piece of equipment in which transmission 2 is contained, shift ring 32 is slid along shift sleeve 18 to move keys 22 through keyways 8.

Each gear 6 includes a central bore 40 rotatably journalled on metallic sleeve 14. In addition, each gear 6 has a plurality of lug receiving pockets 42 circumferentially spaced around bore 40, e.g. four such pockets 42. These pockets 42 do not extend the whole width of gear 6. Rather, each gear 6 also includes an annular flange 44 on one side of the gear closing off one side of pocket 42. Flange 44 is also thickened to extend slightly beyond the face of gear 6 and thereby forms an integral washer between adjacent gears 6. The flange 44 and the washer like portion formed thereby could be located on either side of gears 6, i.e. gears 6 could be flipped over from the position shown in FIG. 1 before assembling on shaft 4.

A spring clip 46 surrounds shift sleeve 18 and is received in clip retaining notches 48 at the very rear of each key 22. Clip 46 presses the rear ends of keys 22 towards one another thereby constantly biasing keys 22 about their fulcrum points. This causes the forward key arm 26 of each key 22 to rise up out of keyway 8 to engage its lug 28 in one of the lug receiving pockets 42 of one of gears 6.

Assuming key 22 is so engaged as shown in FIG. 1 and the operator desires to change speeds, shift ring 32 may be shifted to the left causing keys 22 to slide to the left. As keys 22 engage washer defining flange 44 on the next adjacent gear, i.e. gear 6b, flange 44 cams keys 22 downwardly until keys 22 are wholly contained within keyway 8. In this regard, each lug 28 has sloped leading and trailing surfaces to assist the camming action. As lug 28 clears flange 44, the biasing force provided by spring clip 46 pivots key arms 26 back up out of keyway 8 until lugs 28 engage in pockets 42 in the next gear. Thus, the first gear 6a has been disengaged, the next gear 6b engaged, and the output speed of transmission 2 has been changed to reflect the gear ratio of the newly engaged gear 6b.

The present invention relates to an improved detent means for indicating when keys 22 are located in one of their gear engaging positions. The detent means of this invention comprises a first portion provided on key 22 itself and a second portion contained on shaft 4, preferably in keyway 8 of shaft 4. The first and second detent portions cooperate together to provide a click or stop that may be felt by the operator back through the control linkage.

The first detent portion comprises a rounded bump 50 protruding from bottom surface 24 of key 22. Bump 50 is preferably integrally formed as part of key 22 when key 22 is manufactured. The second detent portion comprises a series of axially spaced notches 54 a-d located in the bottom of keyway 8.

Preferably, notches 54 are located in that portion of keyway 8 contained in plastic shift sleeve 18. Notches 54 can then be easily molded into shift sleeve 18 in the molding process which forms the sleeve. The number of notches 54 is preferably at least equal to the number of change speed gears 6 used on shaft 4. If transmission 2 is also provided with a neutral position in which key 22 is not in engagement with any gear 6, then one additional notch 54 will be provided. Thus, notches 54 a-d correspond to detent positions for each of the three gears 6 and for a neutral position. If transmission 2 is provided with a reverse gear, then a reverse detent notch can also be provided on shift sleeve 18.

Notches 54 may have any shape which will receive and retain detent bump 50. One suitable shape for notches 54 is a straight sided ramped configuration. As shown in FIG. 1, the middle two notches 54a and 54b comprises a full V-shaped notch. While the end notches 54c and 54d could also be a full V, they preferably comprise half a V notch for ease in releasing shift sleeve 18 from the molding tool.

The detent means operates in a straightforward manner. Whenever keys 22 have their lugs 28 engaged in lug receiving pockets 42 of a gear, bump 50 on keys 22 will be received in one of notches 54. As keys 22 are slid from one gear to the next, bumps 50 are moved into engagement with the next adjacent notches 54. Thus, the bump and notch detent structure of this invention provides a plurality of detent positions which may be sensed by the operator.

Bump 50 on each key 22 is desirably placed on bottom surface 24 of key 22 at or closely adjacent the fulcrum point. If bump 50 is placed to the rear of the fulcrum point, it may not always be received in a notch due to the pivoting action of keys 22. For example, keys 22 are not always rotatably aligned with the lug receiving pockets 42 of the next gear when they are slid into engagement with that gear. In that case, the forward arms 26 of keys 22 are in engagement with the lands between pockets 42 and are prevented from pivoting up into pockets 42 until transmission 2 is engaged and shaft 4 rotates enough to align the lugs 28 with pockets 42. But, if arms 26 are pivoted down by being restrained by the lands, the rear ends of arms 26 will be raised up above the bottom of keyway 8 and a bump 50 located there will not be in engagement with notches 54. However, a bump 50 located at or close to the fulcrum point will always be in position to engage a notch, regardless of whether the lug containing arm 26 is pivoted up or not.

The detent means provided by this invention has numerous advantages over prior art transmission detents. First, the position of shift key 22 is sensed directly by having bump 50 on key 22 and the detent indication will not become misaligned with the actual key 22 location. In other words, the operator will feel the detent when, and only when, key 22 is actually in engagement with one of gears 6 or in its neutral position.

Secondly, the detent means of this invention is simpler and less expensive than those of the prior art. All that is required is the addition of bump 50 to key 22 and the placement of notches 54 in keyway 8. This adds practically no additional cost to these parts and allows the other more conventional detent means to be completely discarded. In addition, the detent means of this invention is extremely durable.

Various modifications of this invention will be apparent to those skilled in the art. For example, it is preferred that the detent means disclosed herein be used between each key 22 and each keyway 8 provided in transmission 2. As shown in FIG. 1, both keys 22 have bumps 50 and both keyways 8 have notches 54. However, in a transmission 2 using multiple keys 22 and keyways 8, it would not be necessary to provide the detent means on all keys 22 and keyways 8, but on at least one.

Thus, the scope of this invention is to be limited only by the appended claims.

We claim:

1. An improved variable speed transmission of the type having speed change gears rotatably journalled on a shaft, a key slidably carried on the shaft for moving between the gears, means for coupling the key to the gears for rotating one gear at a time with the shaft, wherein the key has a bottom surface in sliding engagement with the shaft, the bottom surface of the key formed with a fulcrum point intermediate its ends about which the key pivots to engage and disengage the gears, shift means for moving the key relative to the shaft between the different gears to change the output speed of the transmission, and detent means for indicating different detent positions of the key in which the key is coupled to the various gears, wherein the improvement comprises detent means having a first detent portion carried on the bottom surface of the key and a second detent portion contained on the shaft, wherein the detent portions cooperate together to define the detent position, wherein the first detent portion is located at the fulcrum point of the key so as to engage the second detent portion on the shaft regardless of the pivotal orientation of the key.

2. An improved transmission as recited in claim 1, wherein the shaft has a longitudinal keyway and the key is contained at least partially in the keyway and is slidable in the keyway for moving between the gears, wherein the keyway has a bottom surface, and wherein the notches are located in the bottom surface of the keyway.

3. An improved transmission as recited in claim 2, wherein the shaft comprises an inner shaft member and an outer sleeve assembly carried on the inner shaft member and fixed relative thereto for rotation with the inner shaft member, wherein the outer sleeve assembly carries the keyway.

4. An improved transmission as recited in claim 3, wherein at least a portion of the outer sleeve assembly includes a molded plastic sleeve member containing at least a portion of the keyway, and wherein the notches are integrally molded into the keyway portion contained in the plastic sleeve member.

5. An improved transmission as recited in claim 1, further including a shaft having a plurality of keyways and a plurality of generally identical keys with one key being received in each keyway, wherein the shift means is provided with means acting on all the keys to move the keys together as a unit in the keyways, and wherein the first detent portion is provided on at least one of the keys.

6. An improved transmission as recited in claim 5, wherein each of the keys includes the first detent portion.

7. An improved transmission as recited in claim 1, wherein the key is an integrally formed one-piece key.

8. An improved transmission as recited in claim 1, wherein the first detent portion is a protrusive bump on the key, and the second detent portion is a plurality of longitudinally spaced notches on the shaft to receive the bump on the key.

9. An improved transmission as recited in claim 1, wherein the key is a relatively rigid one-piece key.

* * * * *